D. McF. MOORE.
MECHANICAL JOINT FOR VACUUM TUBES.
APPLICATION FILED APR. 16, 1908.
961,151.
Patented June 14, 1910.
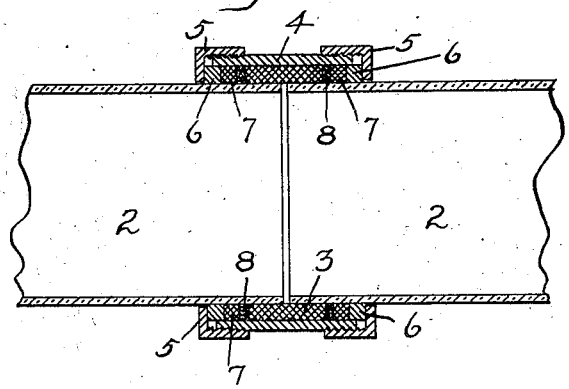
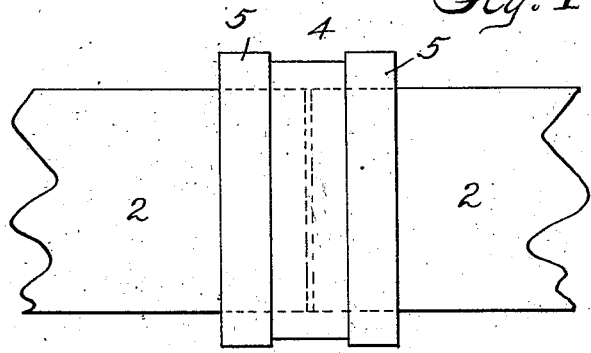
WITNESSES:
INVENTOR
Daniel McFarlan Moore
BY
ATTORNEYS

UNITED STATES PATENT OFFICE.

DANIEL McFARLAN MOORE, OF NEWARK, NEW JERSEY, ASSIGNOR TO MOORE ELECTRICAL COMPANY, OF NEW YORK, N. Y., A CORPORATION OF NEW YORK.

MECHANICAL JOINT FOR VACUUM-TUBES.

961,151.  Specification of Letters Patent.  Patented June 14, 1910.

Application filed April 16, 1908. Serial No. 427,364.

*To all whom it may concern:*

Be it known that I, DANIEL MCFARLAN MOORE, a citizen of the United States, and a resident of Newark, in the county of Essex and State of New Jersey, have invented certain new and useful Improvements for Mechanical Joints for Vacuum-Tubes, of which the following is a specification.

My invention relates to air and gas-tight joints for tubing and is designed to afford a simple and inexpensive mechanical joint that may be used as a substitute for the fused joints heretofore ordinarily employed for the glass tubes of vacuum tube lighting systems.

The special object of the present invention is to provide means whereby a sealing liquid, preferably an oil, may be supplied to the joint proper and by its presence at meeting surfaces and edges of the joint may act to perfect the seal and thoroughly exclude air from entering the tube.

Briefly stated, the invention consists in providing within the mechanism of the joint and in proper juxtaposition to the parts thereof where the seal is to be formed, a mass of some absorbent material containing the desired liquid, such as oil, and in providing means for compressing the material to cause the oil or other liquid to exude therefrom and flow to the parts where, by its location as a film, or as a distinct body of liquid, it will act to perfect the air and gas-tight seal.

In the preferred way of carrying out my invention, the means for compressing the material are the means which constitute the mechanism of the joint for applying pressure to the sealing washers or sleeves.

The invention consists further in the special devices and combinations of devices coöperating in part and in whole to produce the joint and seal as will be hereinafter more particularly described and then specified in the claims.

In the accompanying drawings, Figure 1 is a side elevation of a joint embodying my invention. Fig. 2 is a longitudinal section through the same.

Sections of glass tubing to be joined or coupled together in a joint which shall be air and gas tight are shown at 2 with their ends juxtaposed and assembled in the joint or coupling. Fitting upon the juxtaposed ends and spanning the extremities thereof is a sealing sleeve or ring of any suitable packing material which encircles and fits snugly about the tubes; said sleeve may be of any desired material, but is, by preference, somewhat elastic, so that, by the application of pressure to its ends, it will be caused to hug the tubes more closely.

To cause the expansion of the material of the ring 3, under the compression applied to it to be exerted against the tube, said ring or sleeve is, preferably, fitted within an exterior tube or shell 4 of some expansion resisting material, such as brass or other metal. Said shell 4 may carry, as shown the compression devices consisting, preferably, of nuts 5 engaging the exterior of the shell by a screw-thread and also engaging upon followers 6 encircling the tubes and intervening between the nuts or other compression devices and the parts within the shell, as shown, and serving to take up the wear but to transmit the pressure from the nuts to the sleeve 3 when the nuts are screwed up on the shell. In addition to the sealing sleeve 3, sealing rings or washers 7 may be employed, which rings are also subjected to compression by the nuts and aid in forming the seal, and also prevent escape of the oil.

In juxtaposition to the sealing ring or sleeve 3 and at the ends thereof, are located masses of absorbent compressible material 8, which are in the line of the pressure applied to sleeve 3 by the nuts 5 and which contain the oil or other fluid which, by locating itself at the junction line between the ends of the ring and the surface of the tube, will perfect and insure the air and gas tight joint.

In case the sleeve 3 does not grasp the tube 2 very tightly, the oil or liquid will enter to some extent beneath the sleeve and between the same and the surface of the tube and will act as a sealing film of oil to exclude air from entering the vacuous space in the tube.

The masses of material 8 may be in the form of rings encircling the tubes 2 and located between the rings 7 and the sleeve 3. Previously to their application to the tube during the process of building up the joint on the tube, said rings are soaked in the oil or other sealing fluid and upon the application of pressure by the nuts 5 or other devices after the joint or coupling has been applied to the tubes will give up their sealing oil or fluid.

Any desired absorbent material such, for instance, as felt, may be employed for the rings 8.

Obviously, while my invention is especially useful for glass tubing used for vacuum tubes, it may be applied to tubes of other materials.

What I claim as my invention is:—

1. In a joint for glass tubing, the combination of a sealing sleeve applied over the meeting ends of the tubes, masses of absorbent material containing a sealing fluid applied at the ends of the sleeve and means for compressing the same to furnish a sealing fluid at both said ends, as and for the purpose described.

2. In a joint for glass tubing, the combination of a sleeve encircling and wrapping the tube sections at their meeting ends, oil bearing rings of compressible material adjacent to the ends of said sleeve, and means for compressing said rings, as and for the purpose described.

3. In a joint for glass tubing, the combination of a sealing or packing sleeve, spanning the meeting ends of the tube sections, an external shell or tube within which said sleeve is fitted, absorbent, compressible rings containing a sealing liquid fitted within the shell and against the ends of the sleeve and compression devices on the shell, as and for the purpose described.

4. In a joint for glass tubing, the combination of a sealing sleeve, rings of compressible liquid-bearing substance at the ends of said sleeve, sealing rings or washers applied over the compressible rings of absorbent material, an external shell or tube within which said parts are fitted, and compression devices mounted on said shell.

5. In a sealed joint for glass tubing, the combination of a closed external shell or tube, a sealing ring or sleeve fitted therein and encircling the tube ends, a pair of sealing rings, rings of absorbent material between the latter and the sleeve, and compression nuts mounted on the shell for applying pressure to the pair of sealing rings and through them to the rings of absorbent material within the shell.

6. In a sealed joint for glass tubing, the combination of an exterior shell or tube of metal provided with nuts at its ends, and a sealing sleeve, sealing rings and oil-bearing rings fitted within said shell, said oil-bearing rings being located between the sleeve and the sealing rings, as and for the purpose described.

Signed at New York in the county of New York and State of New York this 14th day of April A. D. 1908.

DANIEL McFARLAN MOORE.

Witnesses:
C. T. TISCHNER, Jr.,
LILLIAN BLOND.